INVENTORS:
GEOFFREY PURDY
GEORGE N WALTON
BY
Breitenfeld & Levine
ATTORNEYS

United States Patent Office 3,429,115
Patented Feb. 25, 1969

3,429,115
MACHINE FOR MAKING CABLES OR ROPES
Geoffrey Purdy, Hartshead, and George N. Walton, Royton, England, assignors to David Bridge & Company Limited, a corporation of Great Britain
Filed Oct. 12, 1967, Ser. No. 674,934
U.S. Cl. 57—52                                9 Claims
Int. Cl. D01h 9/00

ABSTRACT OF THE DISCLOSURE

Rotatable carriage carries pivotally mounted cradles, each adapted to receive a bobbin of wire or the like. Remotely controlled means load a number of bobbins simultaneously into the carriage, and means within each cradle temporarily support bobbin until remotely controllable pintles carried at the sides of cradle move into engagement with bobbin and rotatably support it.

---

The present invention relates to cable- or rope-making machines of the kind in which filaments of material (for example, strands, cores or wires) are unwound from bobbins mounted in a rotary carriage, the strands being collected along the axis of rotation of the carriage and twisted together by such rotation to form the rope or cable. Machines of this kind are used for example, for making cable or wire rope and for armouring cable.

One disadvantage of known machines of the kind aforesaid is that the mounting of the full bobbins in the carriage and the removal of the spent bobbins takes considerable time, and the chief object of the present invention is to provide a machine in which the loading and unloading of bobbins can be carried out more quickly than has been possible hitherto.

According to this invention, a cable- or rope-making machine of the kind referred to, is characterised by mechanical and remotely-controlled means for batch handling of the bobbins during loading and reloading of the carriage.

Each bobbin mounting in the carriage may be provided with means for locating a bobbin in at least approximately coaxial relation with a pintle or pintles upon which said bobbin is subsequently to be rotatable.

Preferably there are two opposed pintles adapted for simultaneous entry into sockets at opposite ends of the bobbin, said pintles being tapered so that their advancement relatively to said bobbin automatically disengages the latter from its locating means.

Each cradle may be provided with transverse guides adapted to engage the outer periphery of the entering bobbin to effect approximately centralization of the latter with reference to the pintles. Further guides in the cradle may then cooperate with the ends of the bobbin, adjustable pads being provided on such further guides to engage machined flanges on the latter and thereby effect its final location.

Conveniently the pintles are rotatable in coaxial pistons slidable in cylinders in the cradle sides, pneumatic rams disposed transversely of the pintle axes being connected to follower rollers engaging cam profiles on the outer ends of said pistons.

Each bank of cradles in the carriage may comprise multiples of two or more which, by step-by-step rotation of such carriage, can be successively brought into a position permitting their simultaneous removal or replacement by means of mechanically-operated grabs.

Preferably such grabs are mounted on a single rail car which is movable between a position adjacent the carriage and another position at which full bobbins can be picked up for transference to the cradles or spent ones deposited after removal from the latter.

Figure 1:
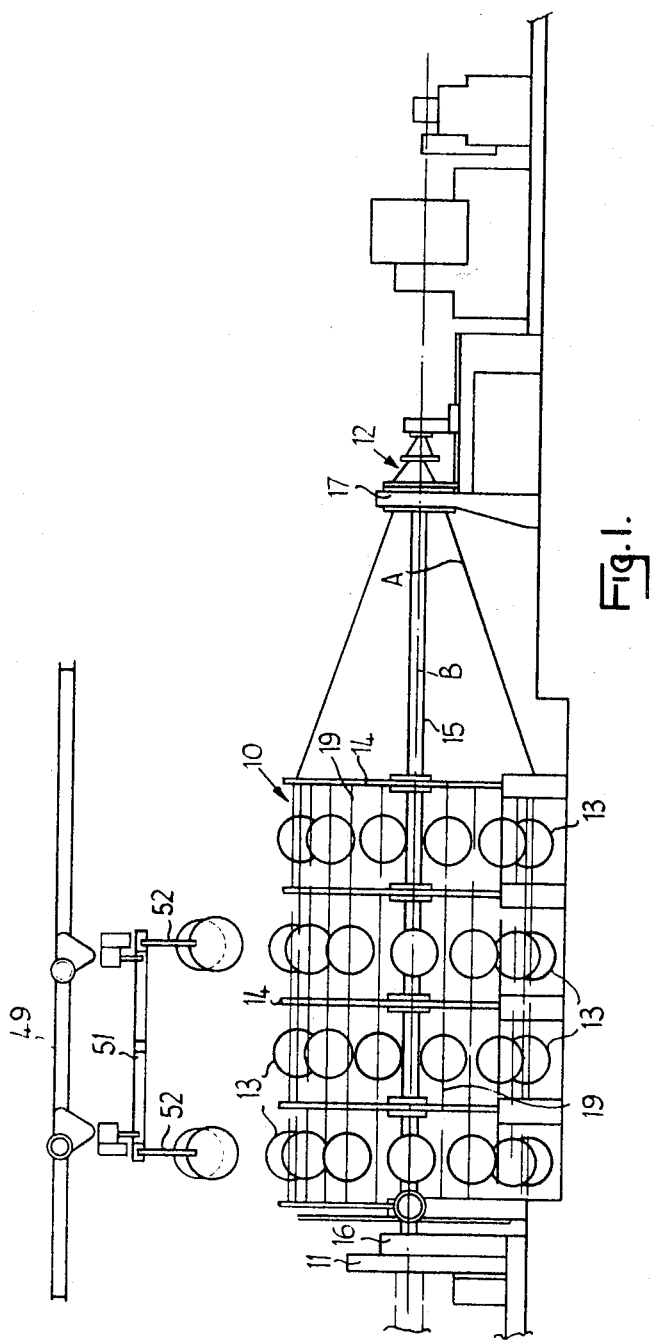
Figure 2:
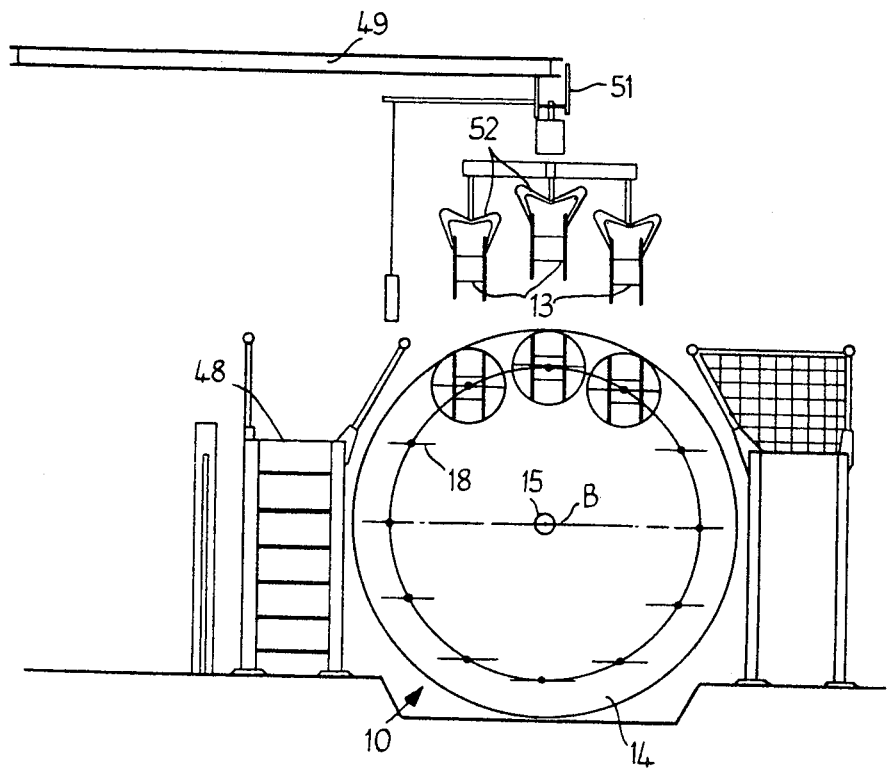
Figure 3:
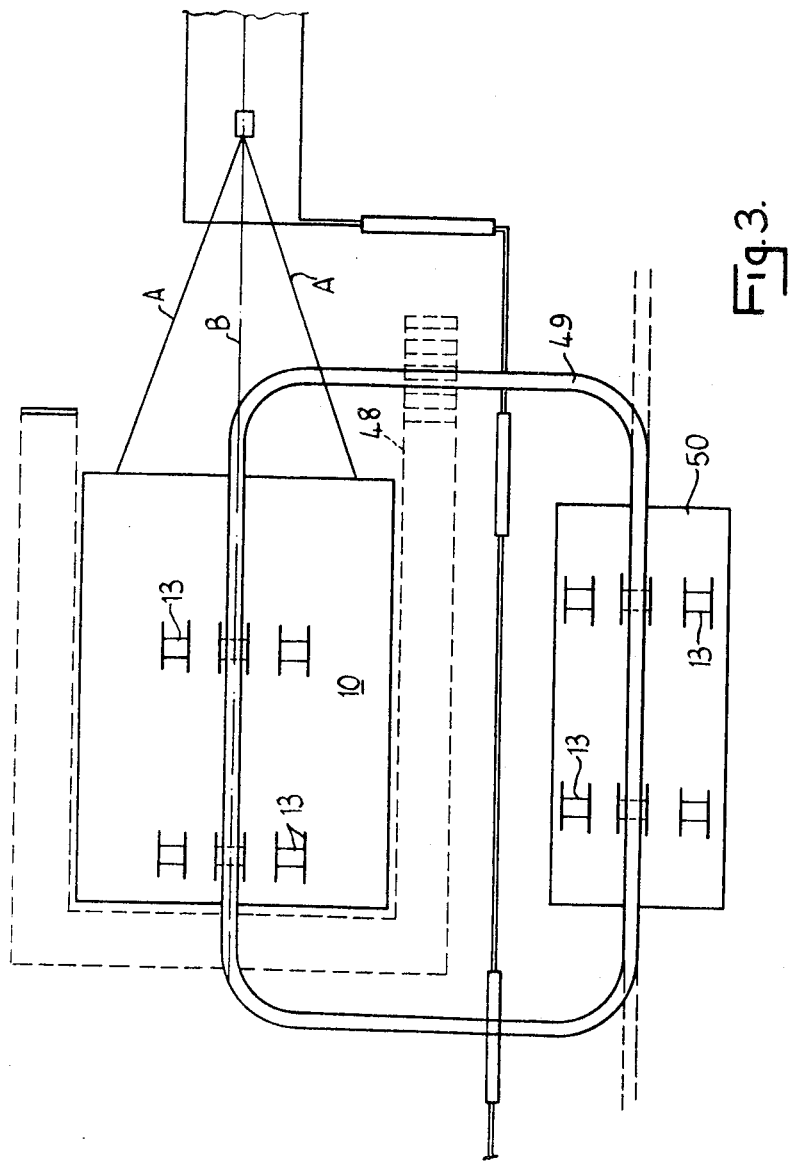
Figure 4:
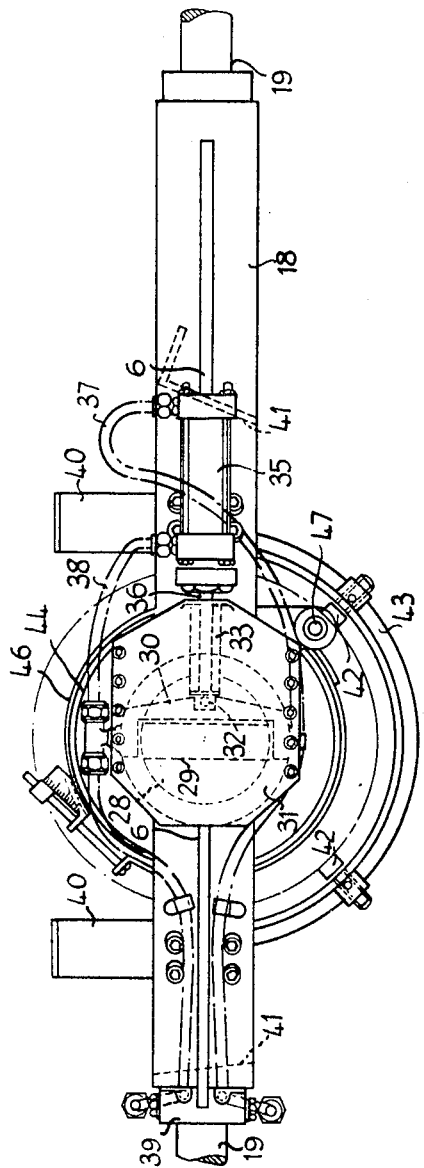
Figure 5:
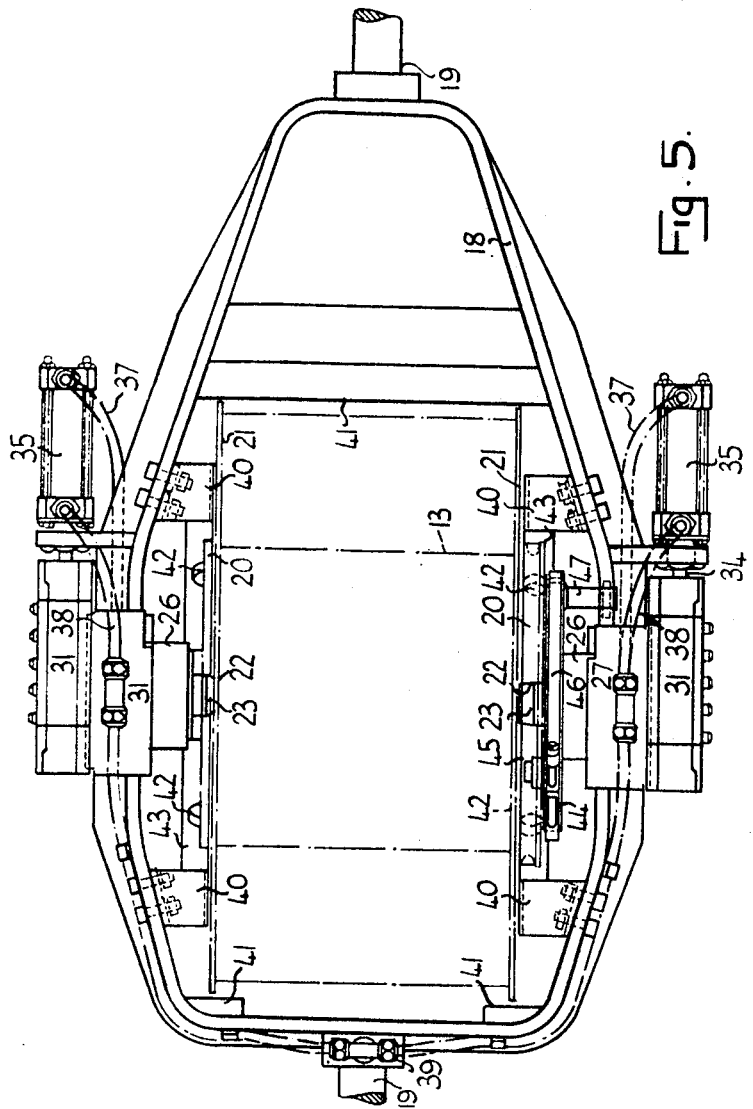
Figure 6:
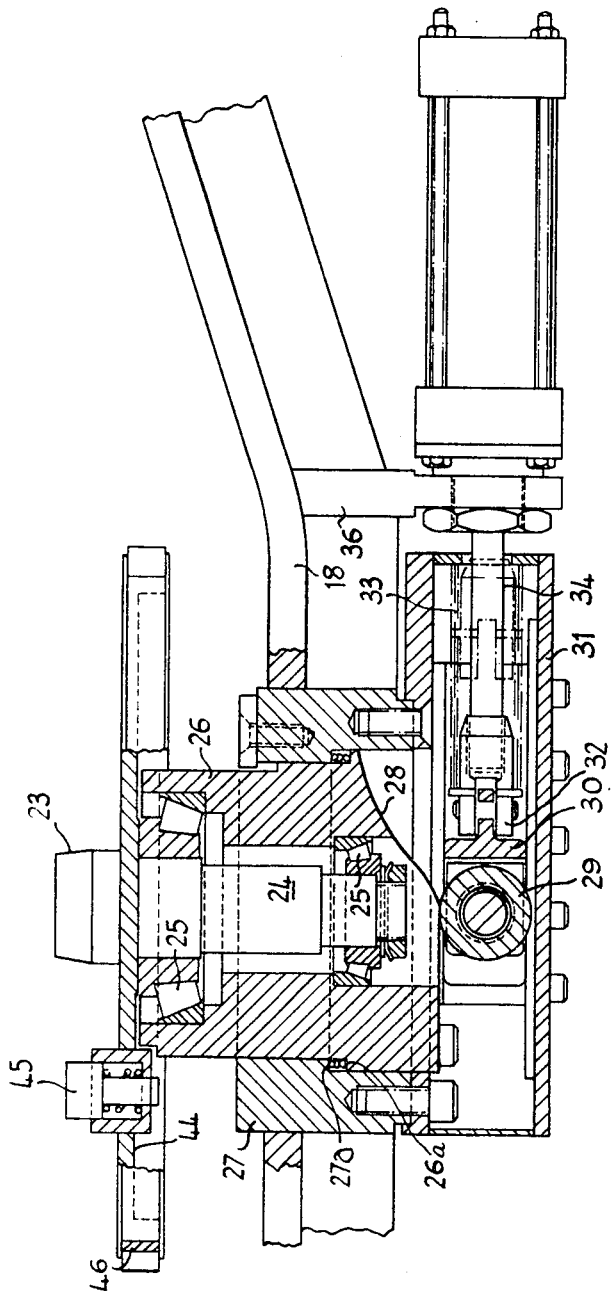

In the accompanying drawings:
FIGS. 1 and 2 are schematic side and end elevations of one form of machine according to the present invention,
FIG. 3 is a plan view,
FIG. 4 is an enlarged end elevation of one of the bobbin cradles indicated in FIG. 2,
FIG. 5 is a plan view, and
FIG. 6 is a section on the line 6—6 of FIG. 4.

In the example illustrated in FIG. 1, the invention is applied to a machine for laying-up armouring wires A upon a cable indicated at B, and comprising a four-bank bobbin carriage 10 with driving means 11 and a collecting head 12 at which the several wires A from the bobbins 13 are applied to the cable B.

The carriage 10 consists of five circular frames 14 fixed at spaced positions upon a hollow shaft 15 which is supported in bearings 16, 17 and through which the cable B passes to the collecting head 12.

Between each two consecutive pairs of frames 14 is arranged a bank of (say) twelve bobbin cradles 18 adapted for oscillation about axes which are parallel to the carriage shaft 15, equidistant therefrom and arranged at equal angular intervals around it.

Corresponding cradles 18 in alternate banks are staggered relatively to those in the other two banks, and provision is made in known manner for maintaining all the cradles in horizontal planes as the carriages 10 rotates. For example, the trunnions 19 of the several cradles in each bank may be provided with drop-arms perpendicular to the respective planes of such cradles, the free ends of these drop-arms being connected to a ring rotating in eccentric relation to the shaft 15.

In the preferred arrangement shown in FIGS. 4 to 6, each cradle 18 is of generally oval profile and has its trunnions 19 aligned with its major axis.

The body of the bobbin 13 to be accommodated therein is provided with machined end flanges 20 and retaining discs 21 for the winding of armour wire A, the end flanges 20 having plain central holes 22 to receive tapered pintles 23 which are slidably mounted at opposite sides of the cradle 18.

Each pintle 23 is formed at one end of a short coaxial shaft 24 mounted in two sets of angular-contact roller bearings 25 in a coaxial shouldered piston 26 adapted to reciprocate within a complementary cylinder 27 carried by the cradle 18.

The larger end of the piston 26, surrounding the outer bearing 25, is formed with a cam face 28 engaged by a follower roller 29 in a yoke 30 which is guided, for movement diametrally of the piston 26, in a housing 31 secured to the outer end of the cylinder 27.

This housing also contains a clevis 32, spring-loaded at 33, which is pivoted to the yoke 30 and fixed upon the piston-rod 34 of a double-acting pneumatic ram 35 carried by a bracket 36 on the cradle 18.

Pipes 37, 38 lead from the outer and inner ends, respectively, of the two rams 35 to a running joint 39 which is arranged at one end of the cradle 18 and connectable to a source of compressed-air whose admission through the pipes 37 causes substantially simultaneous advancement of the pintles 23 through the medium of the yoke rollers 30 and cam faces 28. The springs 33 serve to hold the pintles 23 projected when no air pressure is available at the running joint 39.

When the supply pressure is transferred to the pipes 38, the rollers 29 are withdrawn against the action of the springs 33, and the pintles 23 are positively retracted by admission of compressed air, through the T's 38a and suitable ducts, to the annular spaces between the coacting shoulders 26a, 27a of the pistons 26 and cylinders 27.

When a bobbin 13 is to be mounted in the cradle 18, it is suspended with its axis transverse thereto and lowered so that its end discs 21 engage between pairs of inwardly projecting brackets 40 at opposite sides of the cradle.

A preliminary lateral adjustment of the bobbin 13 is effected by engagement of the edges of the discs 21 with ramps 41 arranged adjacent opposite ends of the cradle 18, after which the machined peripheries of the flanges 20 come into contact with adjustable pads 42 on arcuate bridge members 43 connecting opposite pairs of the brackets 40 to effect final centralization of the bobbin with reference to the retracted pintles 23. In practice, when the bobbin 13 is rested on the pads 42 as aforesaid, its axis is slightly below that of the tapered pintles 23, so that advancement of the latter will raise the bobbin flanges 20 clear of the pads 42.

In order that the wire A may be maintained under tension during unwinding, one of the pintle shafts 24 has fixed thereto a drum 44 adapted to be locked to the adjacent bobbin flange 20 by means of a spring-loaded detent 45 and encircled by a brake-band 46 which is anchored at 47 to the cradle 18.

In the machine under consideration, the arrangement is such as to enable an operator to load six bobbins 13 at a time (three in each of two alternate banks in the carriage 10) and the cradles 18 are therefore connected in groups of six for supply of compressed air to the two pneumatic rams 35 at each mounting. A compressed air connection (not shown) on a stand 48 for the operator can be plugged into a socket provided for each of the eight groups of six mountings, the sockets being brought adjacent the connection in turn as the carriage 10 is rotated for loading. The supply of compressed air is thus under the control of the operator who can advance or retreat the pintles 23 of a group of mountings whenever he wishes, once the compressed air connection to the particular group has been made.

In order to facilitate transportation of the bobbins 13 to and from the carriage 10, an overhead rail 49 in the form of an oblong loop is arranged to pass over the carriage and over a loading station 50. Two cars 51 are mounted on the rail 49 and each car has two spaced sets of three graps 52 each capable of holding one bobbin 13 by gripping its end discs 21. Movement of the cars 51 along the rail 49 by means of electric motors on the cars and operation of the electrically powered grabs 52 to raise or lower bobbins 13 are under the control of the operator.

To recharge a carriage 10 with loaded bobbins, it is rotated until one of the eight groups of six bobbin mountings is in a position to allow their connection to a source of compressed air. One of the rail cars 47 is then brought over the carriage 10 and its grabs 52 are lowered onto, and caused to grip, the six empty bobbins 13 in the mountings concerned. The compressed air is directed to the six mountings through the pipes 38 so as to withdraw the rams 35 and pistons 26, the resultant retraction of the pintles 23 from the bobbins 13 allowing the latter to be raised by the grabs 52 and carried away by the cars to the loading station 50, from which the second car 51 carrying six full bobbins is subsequently brought to the carriage 10 and positioned accurately above the six vacant mountings so that when the grabs 52 are lowered the bobbins will rest upon their respective locating pads 42. After release and raising of the grabs 52, compressed air is admitted through the pipes 37 to the pneumatic rams 35 of the six mountings to advance the pintles 23 into the holes 22 in the bobbins 13 and thereby raise the latter from the pads 42 into their operative positions.

The empty rail car 51 is kept in position above the carriage 10 which is rotated until the next six mountings are in position for connection to the compressed air source. The empty car, after appropriate movement to position it above the other two alternate banks of the carriage, is then used to remove the empty bobbins from this next group of mountings and the procedure described above is repeated until the whole carriage has been recharged.

It is desirable that some form of safety device is provided to prevent operation of the machine for cable-armouring purposes until all the pintles 23 are in their projected positions.

In a modified construction, provision is made for removing and introducing the bobbins 13 from the side of the carriage 10 instead of from above. In this case a truck with six grabs which are extendable horizontally is driven up alongside the carriage and picks up six empty bobbins, being followed by a truck carrying six loaded bobbins whose grabs place the six loaded bobbins in the mounting positions against the locating pads 42 of the cradles 18 concerned. The pintles 23 are then advanced, the grabs withdrawn, and the carriage rotated to bring the next group of six mountings opposite the grabs.

In a machine of this kind, it is desirable the bobbins 13 are floated into their cradles 18 with their axes vertical, the pintles 23 being projected downwardly and upwardly, and the bobbin flanges 20 moved clear of the pads 42 in a horizontal direction.

In a further modification, which obviates the need for the pintles to be tapered, the pads 42 or their equivalent are arranged to locate the bobbins in exact concentricity with such pintles, whose advancement is accompanied by an automatic retraction of the locating means so as to leave the bobbins freely rotatable, such an arrangement being advantageous when the bobbins are very heavy and/or are each adapted to be mounted on a single long pintle.

A possible alternative to the use of retractable bobbin-locating means as above described is to provide for bodily movement of the bobbin mountings with reference to the associated locating means.

We claim:

1. A cable-making machine comprising a rotary carriage, a plurality of bobbins mounted in said carriage at positions spaced angularly around its axis of rotation, strands of material stored upon the individual bobbins and simultaneously unwound therefrom, means for collecting said strands along the axis aforesaid and for twisting the same together to form the cable, and remotely-controlled means for collective mechanical handling of said bobbins during each loading of said carriage.

2. A cable-making machine comprising a rotary carriage, a plurality of cradles provided in said carriage at positions spaced angularly around its axis of rotation for reception of individual bobbins having strands of material stored thereon, at least one pintle in each said cradle for rotatably supporting the associated bobbin, means in each said cradle for temporarily supporting a bobbin in at least approximately coaxial relation with said pintle, means for collecting strands from said bobbins along the rotational axis of said carriage and for twisting the same together to form the cable, and remotely-controlled means for collective handling of said bobbins during each loading of said carriage.

3. A cable-making machine as claimed in claim 2, wherein each bobbin cradle includes two opposed pintles adapted for substantially simultaneous entry into sockets at opposite ends of the associated bobbin, said pintles being tapered so that their advancement relatively to said bobbin automatically disengages the latter from said locating means.

4. A cable-making machine as claimed in claim 2, wherein each bobbin is hollow to receive the pintle of the associated mounting and the locating means of the latter, after initially supporting said bobbin as aforesaid, is automatically retractable to allow said bobbin to rotate freely on said pintle.

5. A cable-making machine as claimed in claim 2, wherein each bobbin cradle includes two opposed tapered pintles adapted for substantially simultaneous movement into sockets at opposite ends of the associated bobbin and said locating means comprises transverse guides adapted to engage the outer periphery of said bobbin on its entry into said cradle.

6. A cable-making machine as claimed in claim 2, wherein each bobbin has machined end flanges with coaxial sockets for respectively receiving opposed tapered pintles in the associated cradle, the bobbin-locating means of the latter including transverse guides adapted approximately to centralize said bobbin with reference to said pintles on first entering said cradle and further adjustable guides to effect final location of said bobbin by engagement with said end flanges.

7. A cable-making machine as claimed in claim 2, wherein each bobbin cradle includes two opposed pintles adapted for substantially simultaneous entry into end sockets of the associated bobbin, coaxial cylinders fixed to opposite sides of said cradle, a piston in each said cylinder having one of said pintles rotatably mounted therein, a cam profile at the outer end of said piston, two pneumatic rams disposed transversely of the common axis of said pintles, and rollers connected one to each of said rams and acting respectively upon the cam profiles of the adjacent pistons to effect advancement of said pintles.

8. A cable-making machine as claimed in claim 1, comprising a rotary carriage, a plurality of cradles provided in said carriage at positions spaced angularly around its axis for reception of individual bobbins having strands of material stored thereon, said cradles being arranged in at least two banks containing equal numbers thereof in multiples of two or more, means for collecting strands drawn from the several bobbins along the axis of said carriage and for twisting the same together to form the cable, means for effecting step-by-step rotation of said cable to bring successive multiples of bobbins in any bank to a specific position, and power-operated grabs for collectively handling a multiple of bobbins at said specific position.

9. A cable-making machine as claimed in claim 8, wherein said grabs are mounted on a single rail car which is movable between a station adjacent said carriage and a second station at which full bobbins can be picked up for transference to said cradles on spent ones deposited after removal from the latter.

References Cited

UNITED STATES PATENTS

| | | | |
|---|---|---|---|
| 2,664,693 | 1/1954 | Bruestle | 57—59 XR |
| 3,123,967 | 3/1964 | Ingham | 57—52 |
| 3,258,136 | 6/1966 | Rockstrom et al. | 242—58.6 XR |
| 3,292,356 | 12/1966 | Hinds | 57—59 |
| 3,319,412 | 5/1967 | Winter et al. | 57—59 |

DONALD E. WATKINS, *Primary Examiner.*

U.S. Cl. X.R.

57—59